US006817098B2

United States Patent
Yuan (10) Patent No.: US 6,817,098 B2
(45) Date of Patent: Nov. 16, 2004

(54) METHOD FOR FORMING INNER FLANGES IN A BUSHING WHICH IS USED TO SECURE A HOSE THEREIN

(76) Inventor: Chin-Chen Yuan, No. 37, Lane 68, Ta-Hsing 3rd St., Taiping City, Taichung Hsien (TW)

( * ) Notice: Subject to any disclaimer, the term of this patent is extended or adjusted under 35 U.S.C. 154(b) by 0 days.

(21) Appl. No.: 10/340,357

(22) Filed: Jan. 9, 2003

(65) Prior Publication Data

US 2004/0134056 A1 Jul. 15, 2004

(51) Int. Cl.[7] .............................................. B21D 53/06
(52) U.S. Cl. ........................... 29/890.049; 29/890.05; 29/890.053; 29/898.057; 72/325; 72/356; 72/370.01
(58) Field of Search ................ 29/890.049, 890.05, 29/890.053, 898.057, 418, 898.054, 898.056; 72/256, 343, 356, 325, 370.01, 370.06

(56) References Cited

U.S. PATENT DOCUMENTS

| 1,852,320 | A | * | 4/1932 | Leighton | .................... 267/263 |
|---|---|---|---|---|---|
| 3,213,525 | A | * | 10/1965 | Creighton et al. | ..... 29/890.049 |
| 4,048,703 | A | * | 9/1977 | Lehnhart | ................ 29/898.057 |
| 4,419,877 | A | * | 12/1983 | Alfano | ......................... 72/325 |
| 4,425,696 | A | * | 1/1984 | Torniainen | ..................... 72/96 |
| 4,476,704 | A | * | 10/1984 | Hage et al. | ................... 72/276 |
| 4,535,519 | A | * | 8/1985 | Kajikawa et al. | ....... 29/890.132 |
| 4,594,874 | A | * | 6/1986 | Bononi et al. | ................. 72/356 |
| 4,691,550 | A | * | 9/1987 | Dietzel | .......................... 72/68 |
| 4,706,355 | A | * | 11/1987 | Kuhns et al. | .......... 29/890.032 |
| 4,809,415 | A | * | 3/1989 | Okayama et al. | ....... 29/890.048 |
| 5,339,523 | A | * | 8/1994 | Hasegawa | ................ 29/898.02 |
| 5,517,844 | A | * | 5/1996 | Yuan | ........................... 72/325 |
| 5,724,850 | A | * | 3/1998 | Yamagiwa et al. | ....... 72/370.02 |
| 6,272,751 | B1 | * | 8/2001 | McMeekin | ............. 29/898.054 |
| 6,505,971 | B2 | * | 1/2003 | Sugimoto et al. | ........... 384/279 |

FOREIGN PATENT DOCUMENTS

JP              60118340 A  *  6/1985   ........... B21D/53/10

* cited by examiner

Primary Examiner—David P. Bryant
Assistant Examiner—Essama Omgba
(74) Attorney, Agent, or Firm—Dellett & Walters (57) ABSTRACT

A method of forming inner flanges in a bushing comprises steps of (a) extruding a bushing into an extruding die, (b) cutting an initial upward flange in the bushing, (c) shaping the initial upward flange into a final inner flange, and (d) repeating steps (a) to (c) to form additional inner flanges.

4 Claims, 12 Drawing Sheets

METHOD FOR FORMING INNER FLANGES IN A BUSHING WHICH IS USED TO SECURE A HOSE THEREIN

BACKGROUND OF THE INVENTION

1. Field of the Invention

The present invention relates to a method for forming inner flanges in a bushing which is used to secure a hose therein, where the bushing is used to attach the hose to exterior devices.

2. Description of Related Art

A conventional method for forming inner flanges in a bushing includes (a) providing an extruding die, (b) extruding a tubular bushing into the extruding die, (c) forming a first inner flange in the bushing and repeating steps (b) and (c) to form a desired number of distinct inner flanges in the bushing.

Figure 14:
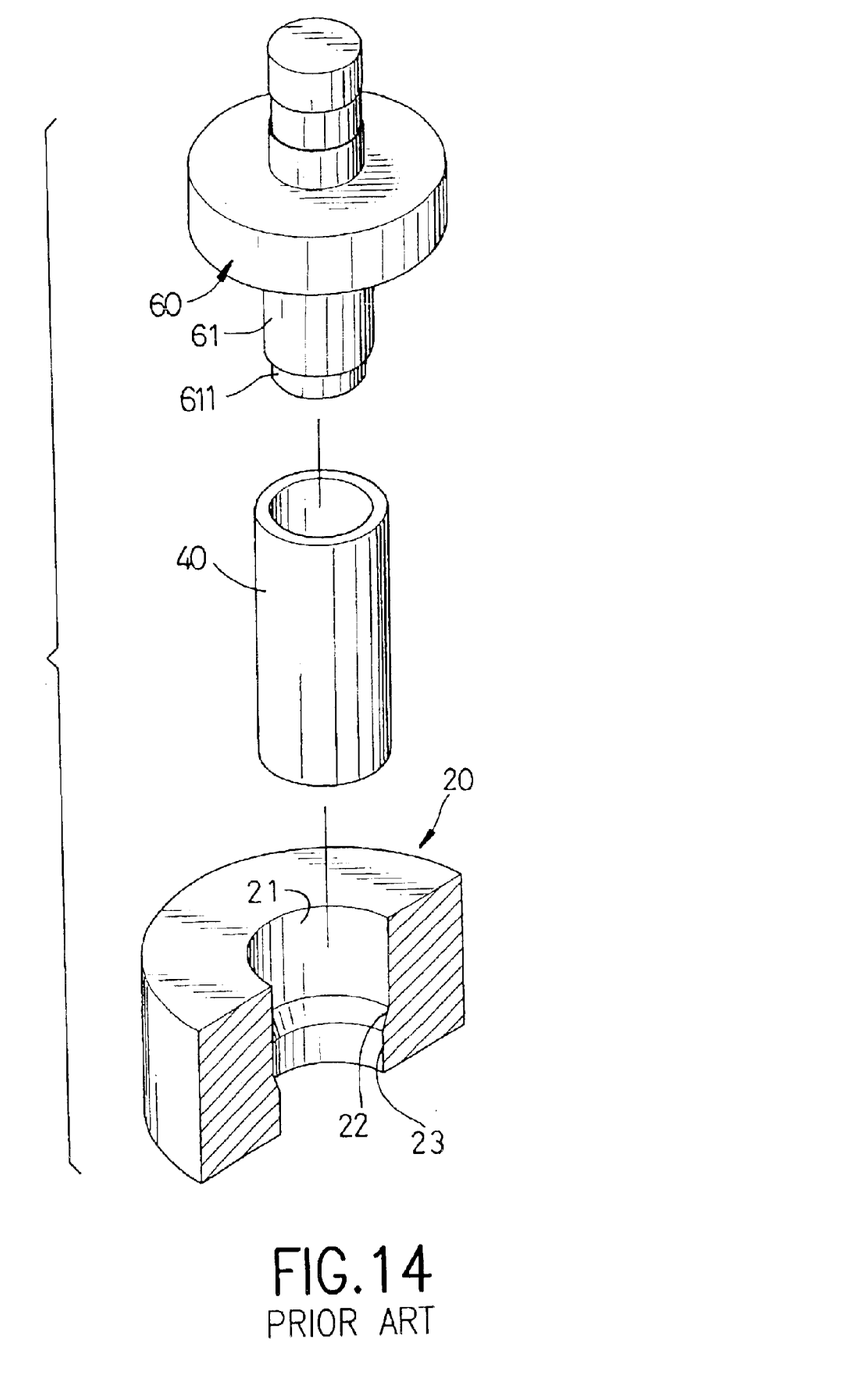
FIG. 14 is an exploded perspective view of a punch, a bushing and an extruding die used in a conventional method to form a bushing.

With reference to FIG. 14, the extruding die (20) comprises a first passage (21), a taper passage (22), and a second passage (23). The second passage (23) has a smaller diameter than the first passage (21) and the taper passage (22) reduces the diameter from that of the first passage (21) to that of the second passage (23). The bushing (40) has an inner periphery (not numbered), an outer periphery (not numbered), a leading end (not numbered) and a following end (not numbered). The leading end of the bushing (40) is extruded first in the extruding die (20), and the following end of the bushing (40) is extruded last in the extruding die (20). The punch (60) comprises a punch head (61) with an extension (611) that has a smaller diameter than the punch head (61).

Figure 15:
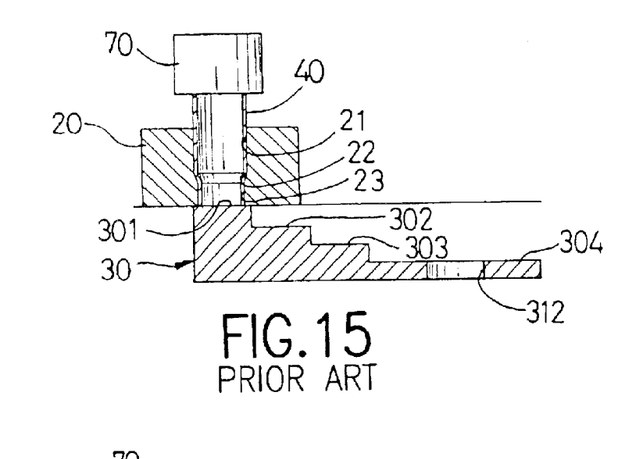
FIG. 15 is an operational cross sectional side plan view of a pressing block pressing a bushing down into the extruding die in accordance with the conventional method.

With reference to FIG. 15, a stepped base (30) has four flat surfaces (301, 302, 303, 304) and a discharge hole (312). The extruding die (20) is perpendicular to the stepped base (30). The four flat surfaces (301, 302, 303, 304) comprise an uppermost flat surface (301), a second flat surface (302), a third flat surface (303) and a lowermost flat surface (304). The extruding die (20) with the bushing (40) and a pressing block (70) is slideably mounted on the stepped base (30) at the level of the uppermost flat surface (301).

Figure 16:
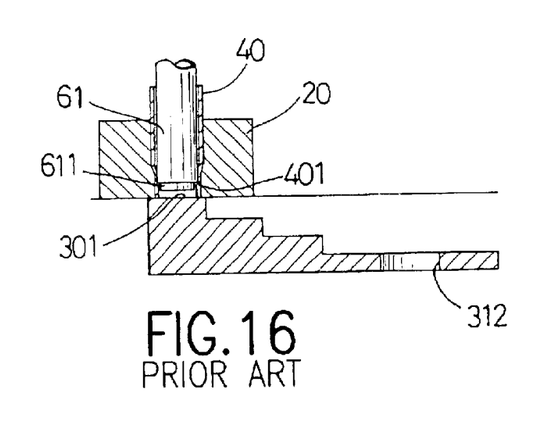
FIG. 16 is an operational cross sectional side plan view of a punch extension creating a first inner flange in the bushing on the uppermost flat surface of the stepped base in accordance with the conventional method.

With further reference to FIG. 16, the leading end of the bushing (40) is pressed into the first passage (21) of the extruding die (20) by the pressing block (70). The extension (611) of the punch head (61) extrudes the bushing (40) into the second passage (23). Therefore, the leading edge of the bushing (40) gradually decreases in diameter as the bushing (40) is extruded through the taper passage (22) and into the second passage (23) of the extruding die (20), and a first inner flange (401) is created.

Figure 17:
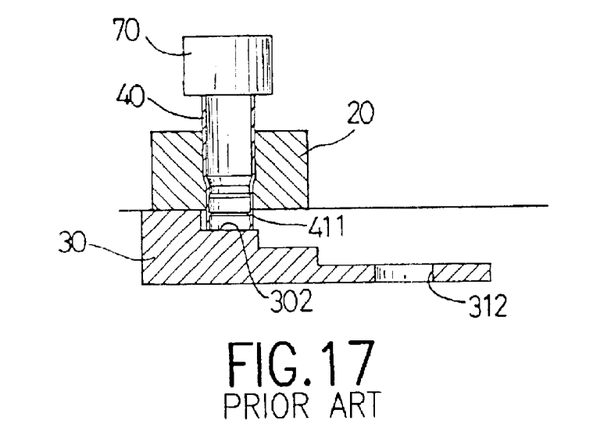
FIG. 17 is an operational cross sectional side plan view of the pressing block pressing the bushing down into the extruding die to a second flat surface of the stepped base in accordance with the conventional method.

With reference to FIGS. 16 and 17, the punch head (61) with the extension (611) is removed from the bushing (40), and the extruding die (20) is placed on the second flat surface (302) of the stepped base (30). The pressing block (70) presses the following end of the bushing (40) and extrudes the bushing (40) into the extruding die (20) until the leading end of the bushing (40) abuts the second flat surface (302) of the stepped base (30). The pressing block (70) is removed.

Figure 18:
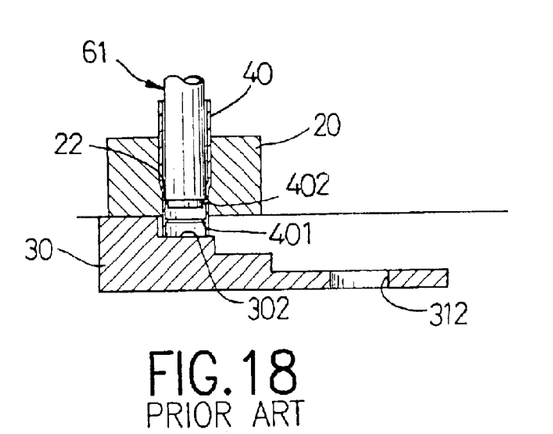
FIG. 18 is an operational cross sectional side plan view of the punch extension creating a second inner flange in the bushing in accordance with the conventional method.

With reference to FIG. 18, the punch head (61) punches the inner periphery of the bushing (40) at the taper passage (22) to form a second inner flange (402).

Figure 19:
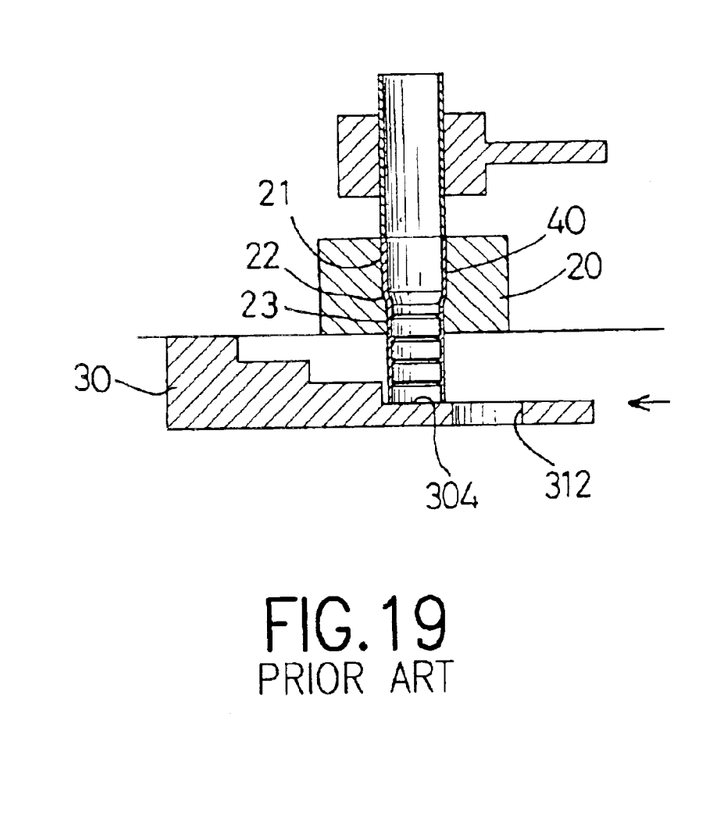
FIG. 19 is an operational cross sectional side plan view of a new bushing being inserted into the extruding die by a clamp in accordance with the conventional method.
Figure 20:
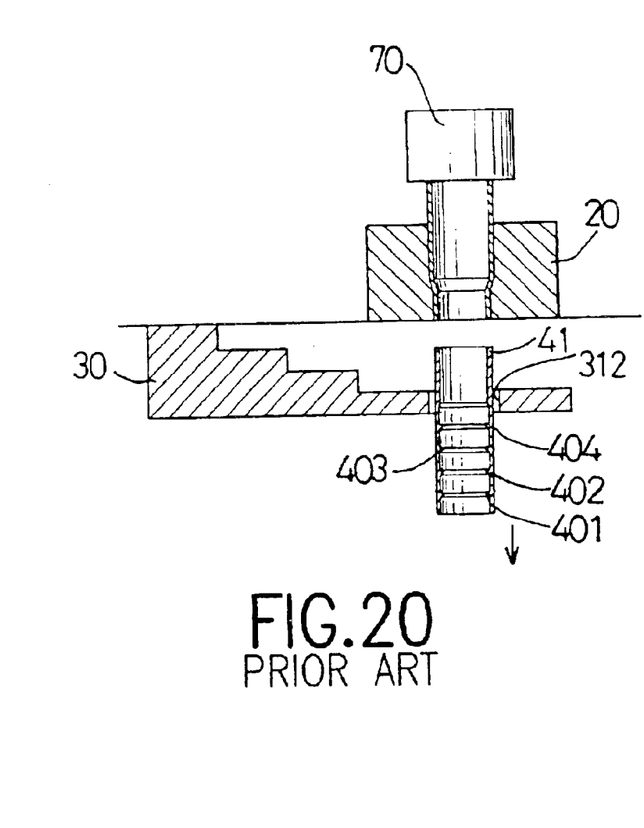
FIG. 20 is an operational cross sectional side plan view of the completed bushing exiting through the discharge hole.

With reference to FIGS. 19 and 20, the steps are repeated by driving the bushing (40) to the third flat surface (303) and the lowermost flat surface (304) of the stepped base (30), to form a third inner flange (403) and a fourth inner flange, (404) in the bushing (40).

When the fourth inner flange is completed, the bushing (41) is driven through the extruding die (20) and the discharge hole (312) on the lowermost flat surface (304) and is ready for exterior application. With reference to FIG. 15, the extruding die (20) is positioned over the uppermost flat surface (301) to make multiple inner flanges in another bushing (40). A new bushing (40) with a pressing block (70) is driven into the extruding die (20) until the bushing (40) abuts the uppermost flat surface (301) of the stepped base (30).

Figure 21:
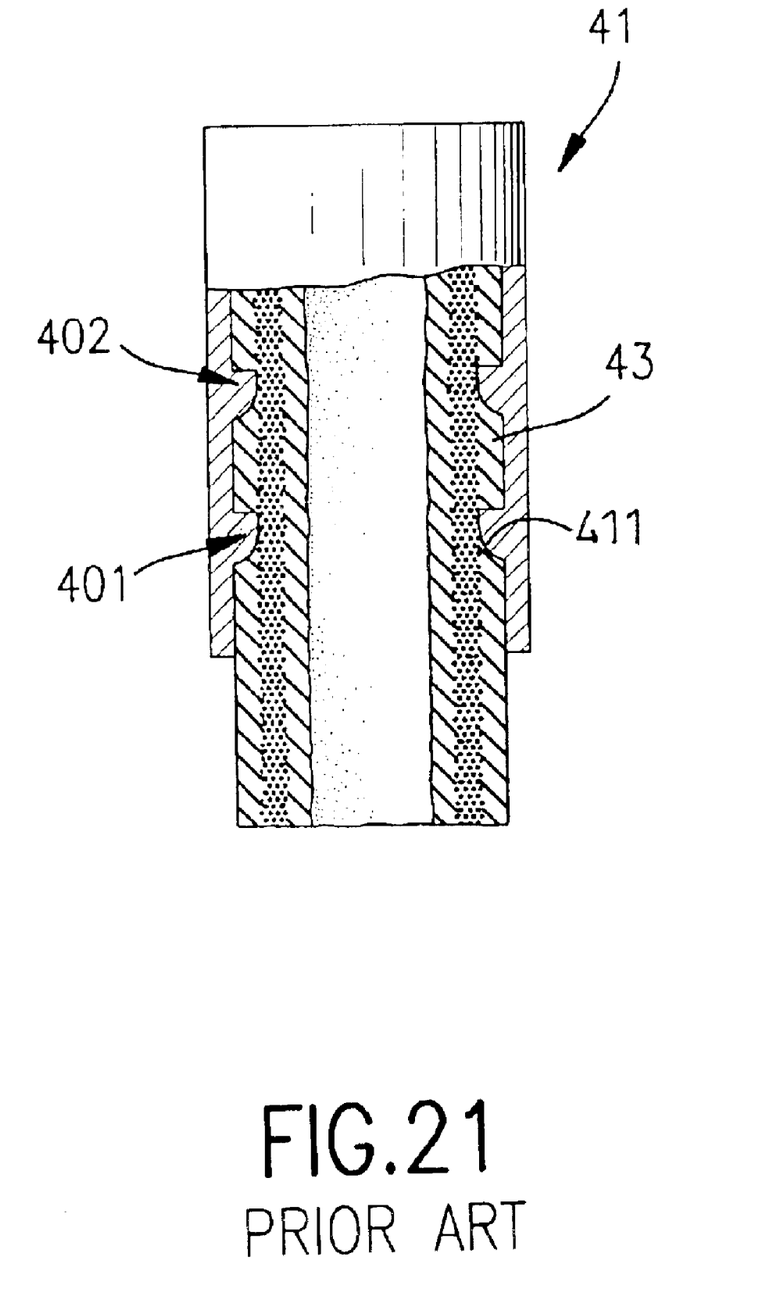
FIG. 21 is a perspective view of a hose mounted in a bushing formed with the conventional method.

With reference to FIGS. 20 and 21, when the busing (41) is used to connect a hose (43), the disadvantage of the conventional method is that a weak connection is formed between the hose (43) and the bushing (41). When inner flanges (401, 402) are formed in the bushing (40) with the conventional method, the shape of each flange (401, 402) is rapidly caused by only one action of the punch head (61). Rapid movement of the punch head (61) will not act a uniform stress on the inner periphery of the bushing (40) during forming each inner flange (401, 402) so that the shape of each flange (40, 402, 402) will be not uniform and will be small. The shape of each flange (401, 402, 402) in bushing (40) results in the flanges (401, 402, 403) being weak and in small mounting area between adjacent flanges (401, 402, 402), and the small mounting area between adjacent flanges (401, 402, 402) causes the weak connection between the outer surface of the hose (43) and the bushing (41). Furthermore, the shape of each flange results in the deformation of flanges under a short period of lifetime.

To overcome the shortcomings, the present invention provides a method to form more effective flanges in a bushing to mitigate or obviate the aforementioned problems.

SUMMARY OF THE INVENTION

The primary objective of the present invention is to provide a method of forming improved inner flanges so that the bushing will provide a robust connection for a hose.

The method uses a flange punch to cut and form initial upward flanges in a bushing, and a flat head punch to flatten the initial upward flanges to final inner flanges. The two step method reduces punching impacts on the final inner flanges and strengthens the final inner flanges so that the bushing will provide a robust connection for connecting a hose.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
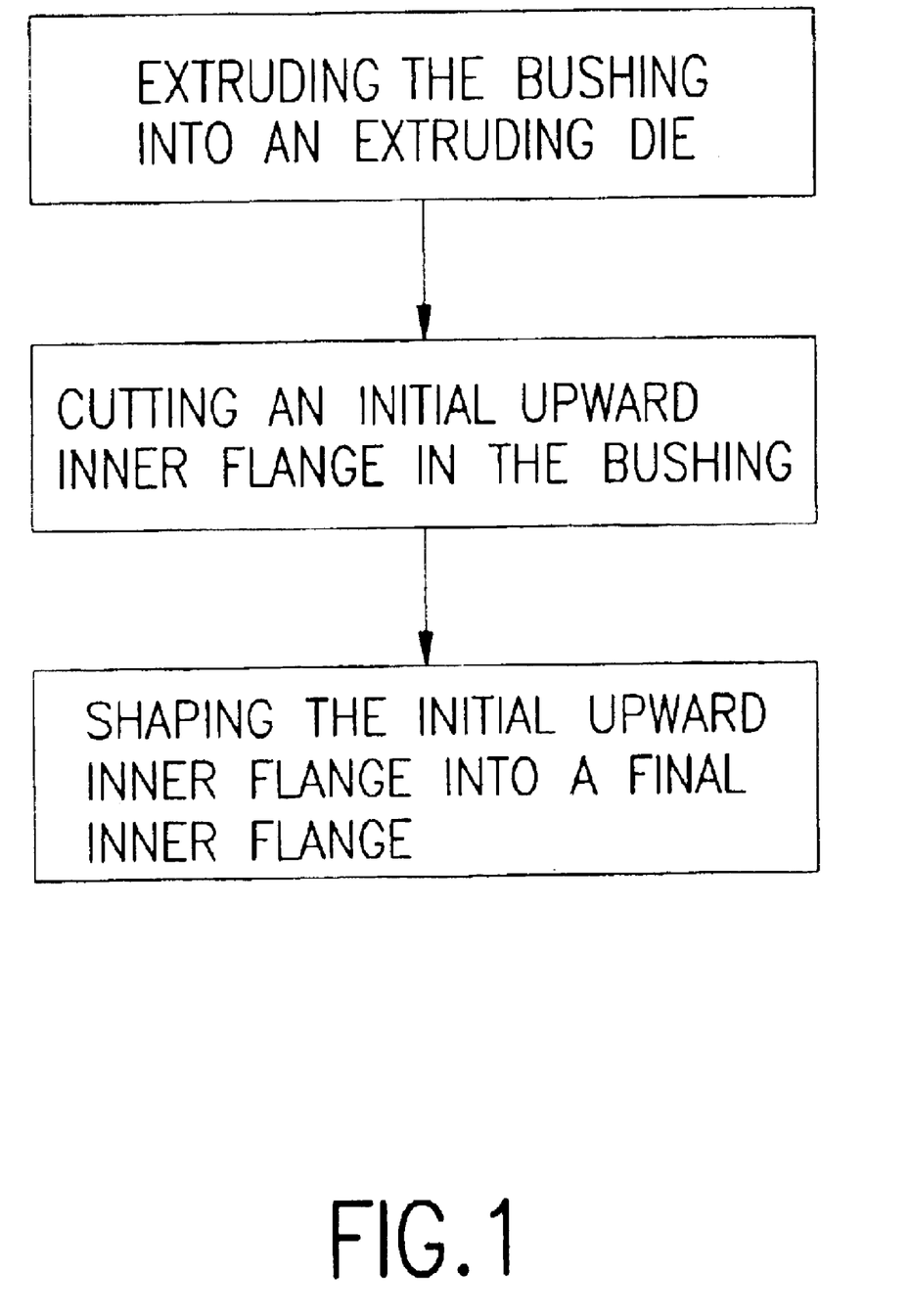
FIG. 1 is a functional block diagram of a method for forming inner flanges in a bushing in accordance with the present invention.

With reference to FIG. 1, a method of forming inner flanges in a bushing in accordance with the present invention comprises (a) extruding a bushing into an extruding die, (b) cutting an initial upward inner flange in the bushing, (c) shaping the initial upward inner flange into a final inner flange, and repeating steps (a) to (c) to form additional inner flanges.

Figure 2:
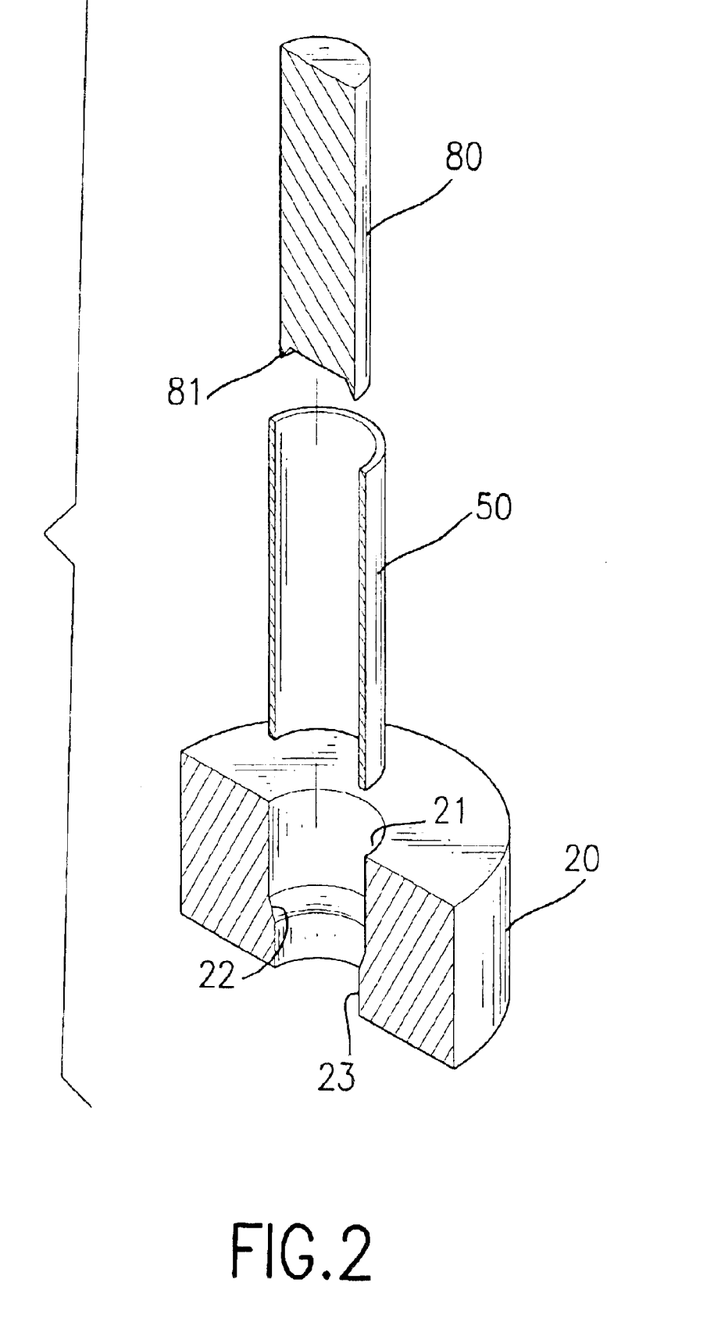
FIG. 2 is an exploded cross sectional perspective view of a pressing block, a bushing and an extruding die mounted on a stepped base used in the method in FIG. 1.
Figure 3:
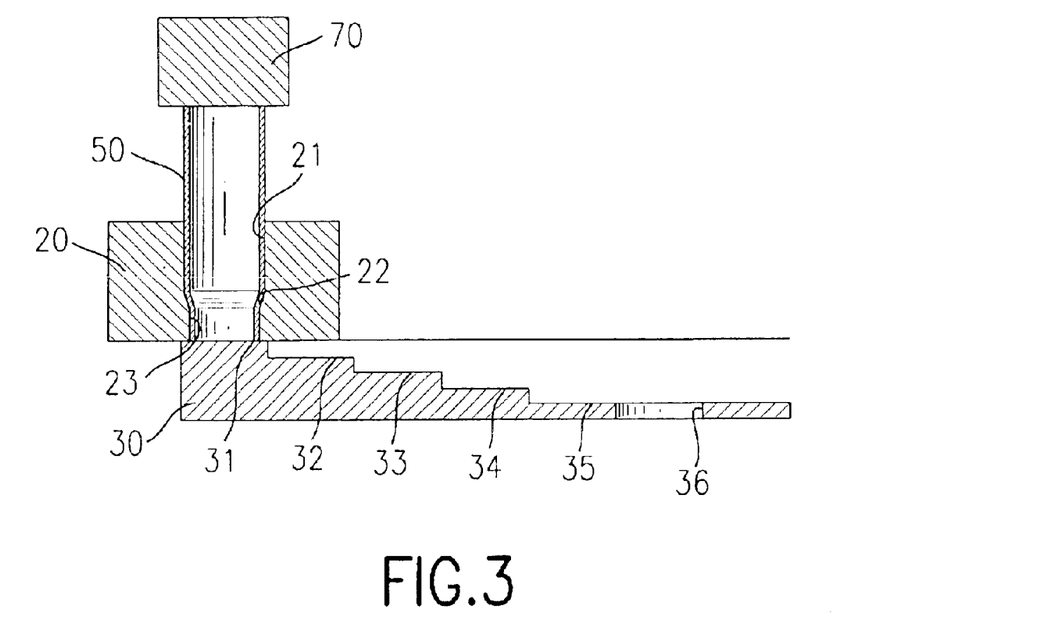
FIG. 3 is an operational cross sectional side plan view of a pressing block pressing the bushing though the extruding die to the uppermost flat surface of the stepped base in accordance with the present invention.
Figure 5:
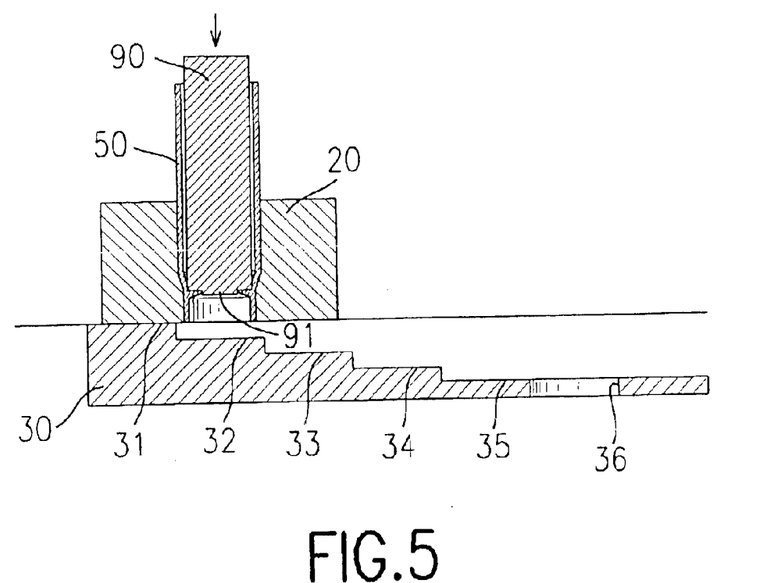
FIG. 5 is an operational cross sectional side plan view of a flat head punch flattening the first upward inner flange in the bushing in accordance with the present invention.

With reference to FIGS. 2, 3 and 5, a device to perform the method of forming inner flanges in a bushing (50) comprises an extruding die (20), a stepped base (30), a pressing block (70), a flange punch (80) and a flat-head punch (90). The stepped base (30) is mounted under the extruding die (20), is stationary relative to the extruding die (20) and has a first end (not numbered), a second end (not numbered), a discharge hole (36) and multiple stepped flat surfaces (31, 32, 33, 34, 35). The stepped flat surfaces (31, 32, 33, 34, 35) are arranged in a stepwise manner from the first end to the second end with an uppermost flat surface (31) at the first end, a lowermost flat surface (35) at the second end and a second flat surface (32), a third flat surface (33), a fourth flat surface (34) between the uppermost and the lowermost flat surfaces (31, 35).

The extruding die (20) comprises an inner periphery (not numbered), and the inner periphery comprises a first passage (21), a taper passage (22) and a second passage (23). The second passage (23) has a smaller diameter than the first passage (21), and the taper passage (22) reduces the diameter from that of the first passage (21) to that of the second passage (23). The extruding die (20) is slideably mounted on the level of the uppermost flat surface of the stepped base (30) and moves across the stepped base (30) from the upper flat surface (31) to the lowermost surface (35) relative to the stepped base (30).

The bushing (50) is a tube with an inner periphery (not numbered), an outer periphery (not numbered), a leading end (not numbered) and a following end (not numbered).

The pressing block (70) is a solid block and is used to press initially the bushing (50) into the passages (21, 22, 23) in the extruding die (20) until the leading end abuts the uppermost flat surface (31). The flange punch (80) is a solid cylindrical rod with a cutting lip (81) and is used to cut the inner periphery of the bushing (50) to shape initial upward inner flanges. The flat-head punch (90) is a solid cylindrical rod with a flat end (91) and is used to flatten the initial upward inner flanges to the final inner flanges.

The specific actions performed in each of the steps in the method to forming inner flanges in a bushing follow.

Initially, reference is made to FIG. 3. In the step of (a) extruding a bushing (50) into an extruding die (20), the leading end of a bushing (50) is mounted slideably in the first passage (21) of an extruding die (20). A pressing block (70) presses and extrudes the bushing (50) into the extruding die (20). The leading end of the bushing (50) is compressed into the second passage (23) of the extruding die (20) until the leading end abuts the uppermost flat surface (21) of the stepped base (30). The pressing block (70) is removed.

Figure 4:
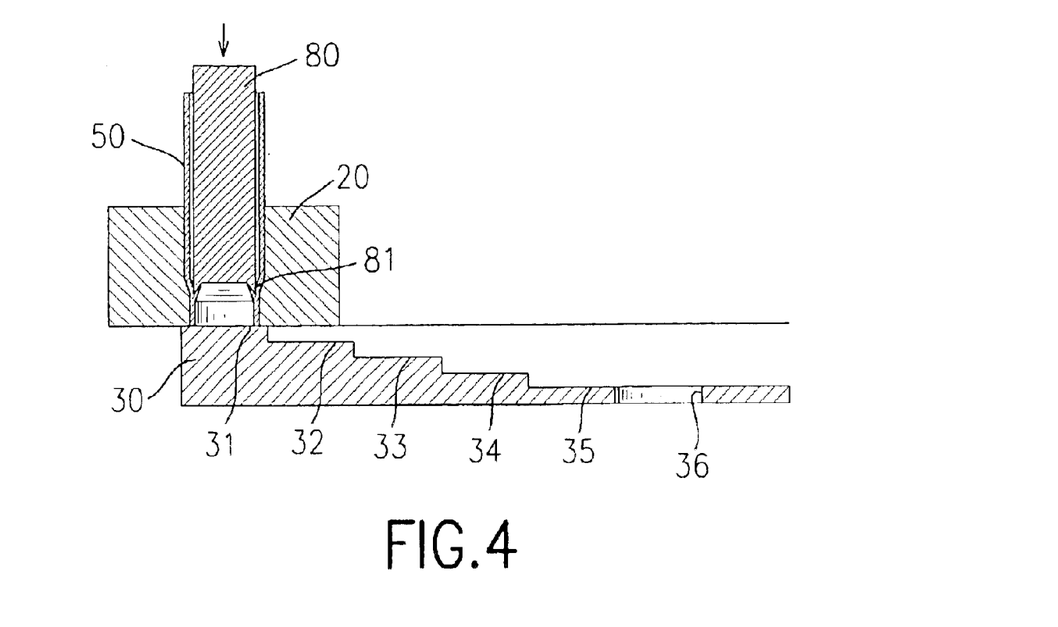
FIG. 4 is an operational cross sectional side plan view of a flange punch creating a first upward inner flange in the bushing in accordance with the present invention.

With further reference to FIG. 4, the flange punch (80) is slideably inserted into the bushing (50) to perform the step of (b) forming an initial upward inner flange in the bushing (50). The flange punch member (80) freely slides in the bushing (50) with the cutting lip (81) to form an initial upward flange at a position corresponding to the taper passage (22). With the leading end of the bushing (50) abutting the uppermost flat surface (31) of the stepped base (30), the cutting lip (81) of the flange punch (80) will shape the initial upward flange in the inner periphery of the bushing (50) when the flange punch (80) is pressed down. The flange punch (80) is removed.

Figure 6:
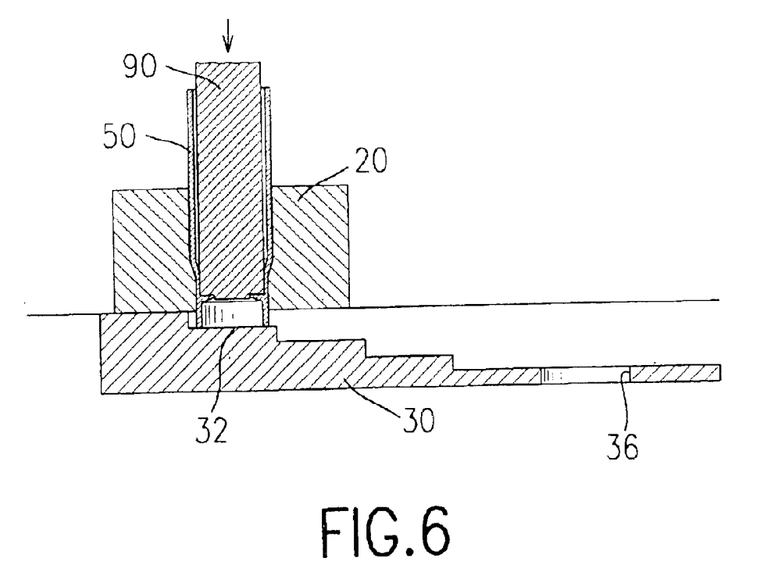
FIG. 6 is an operational cross sectional side plan view of the flat head punch pressing the bushing down to the second flat surface of the stepped base in accordance with the present invention.
Figure 7:
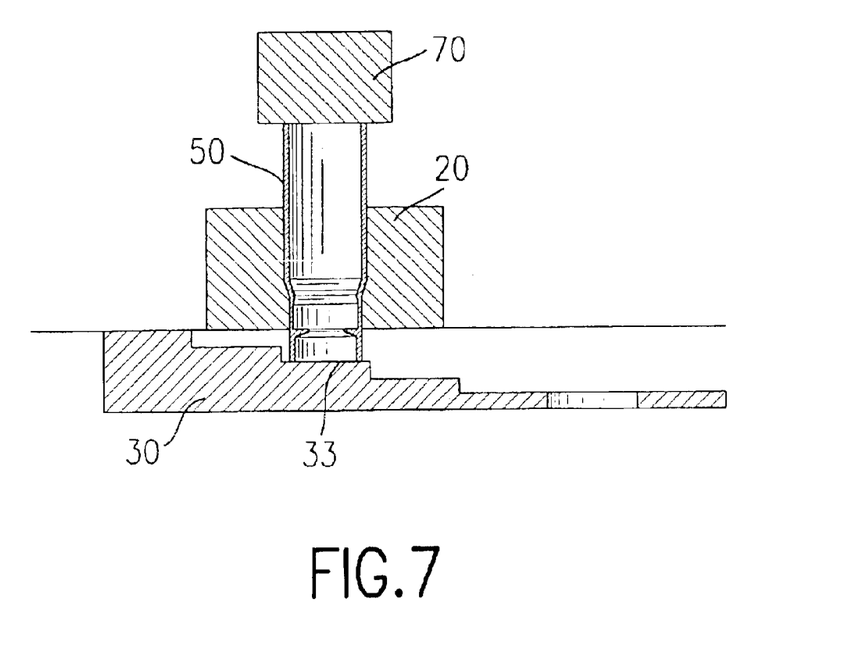
FIG. 7 is an operational cross sectional side plan view of the pressing block pressing the bushing down to a third flat surface of the stepped base in accordance with the present invention.
Figure 8:
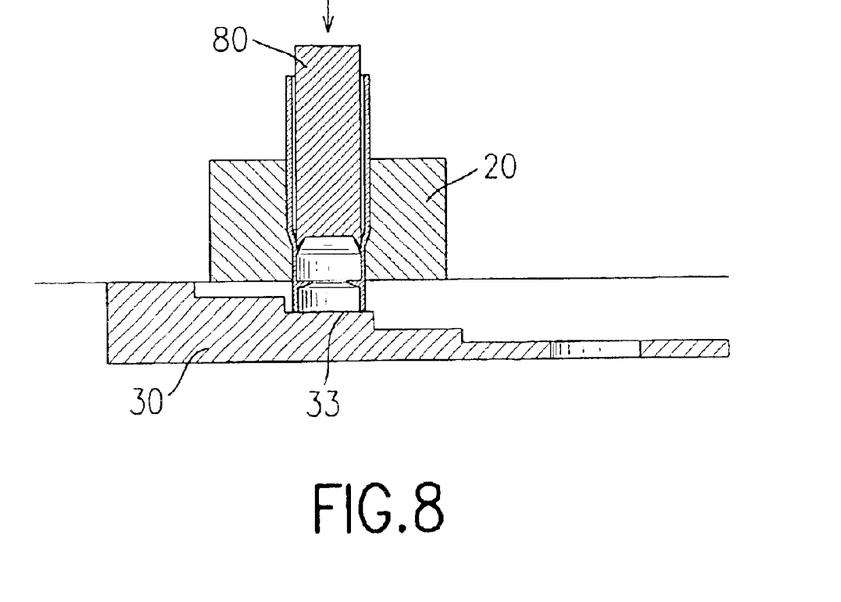
FIG. 8 is an operational cross sectional side plan view of the flange punch creating a second upward inner flange in the bushing in accordance with the present invention.
Figure 9:
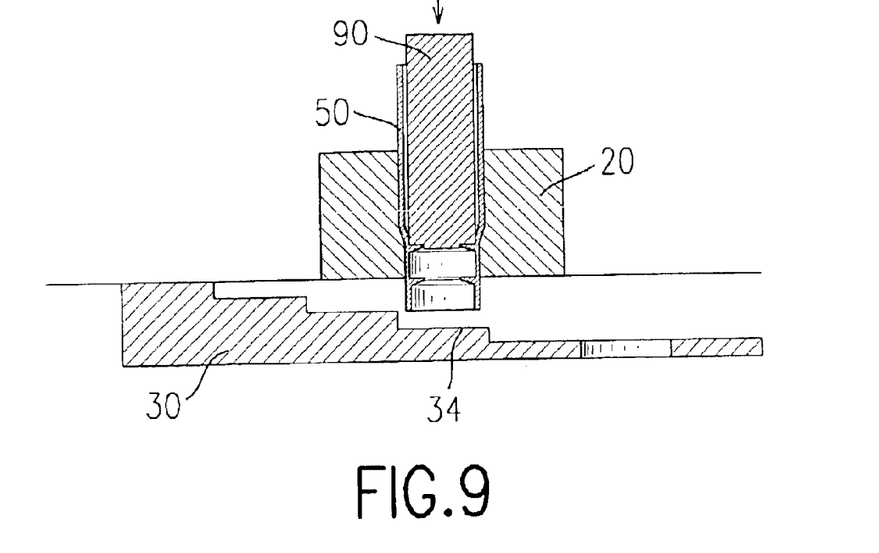
FIG. 9 is an operational cross sectional side plan view of the flat head punch flattening the second upward inner flange in the bushing in accordance with the present invention.
Figure 10:
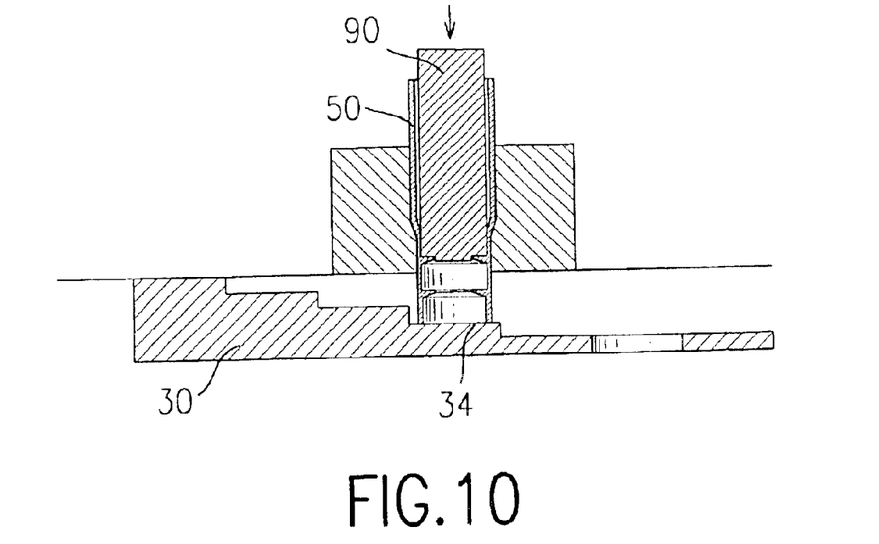
FIG. 10 is an operational cross sectional side plan view of the flat head punch pressing the bushing down to a fourth flat surface on the stepped base in accordance with the present invention.

With reference to FIGS. 5 and 6, the second flat surface (32) of the stepped base (30) is aligned with the extruding die (20), and the flat-head punch (90) is slideably mounted in the bushing (50) to perform the step (c) shaping the initial upward inner flange into a final inner flange. The flat-head punch (90) presses the bushing (50) down with the initial upward flange until the leading end of the bushing (50) abuts the second flat surface (32). The downward movement of the flat-head punch (90) will simultaneously shape the initial upward flange to a final inner flange when the leading end of the bushing (50) abuts the second flat surface (32) of the stepped base (30). The flat-head punch (90) is removed.

With reference to FIGS. 7 to 10, the extruding die (20) with the bushing (50) is moved over the third flat surface (33) on the stepped base (30). The pressing block (70) presses the following end of the bushing (50) until the leading end of the bushing (50) abuts the third flat surface (33) on the stepped base (30). The process of forming the final inner flange as previously described is repeated, and an appropriate number of flat surfaces (31, 32, 33, 34, 35) will form any desired number of the final inner flanges.

Figure 11:
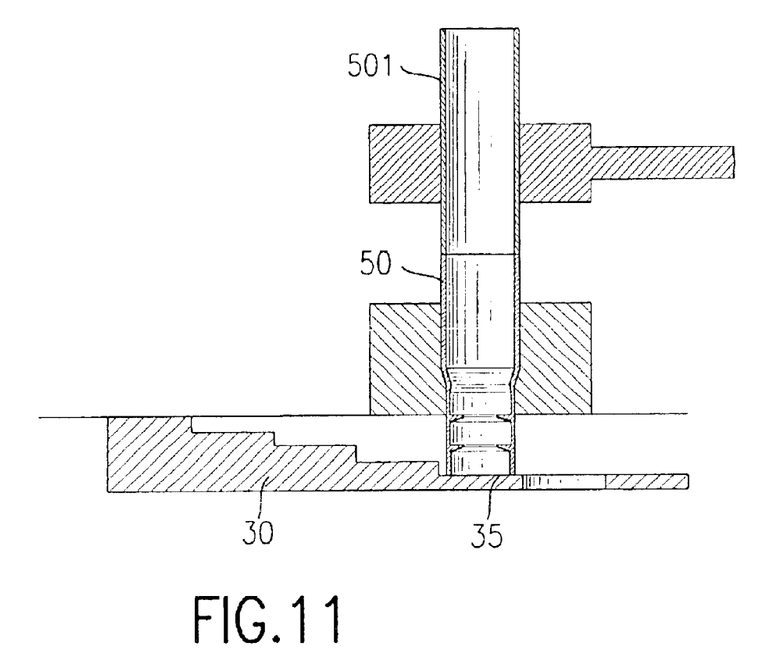
FIG. 11 is an operational cross sectional side plan view of a clamp positioning a new bushing to be inserted into the extruding die in accordance with the present invention.
Figure 12:
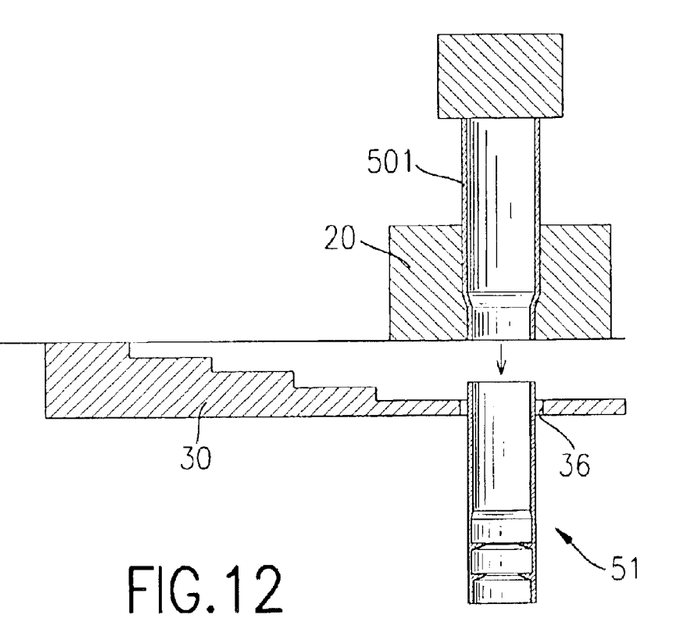
FIG. 12 is an operational cross sectional side plan view of a completed bushing being driven through the discharge hole.

With reference to FIGS. 11 and 12, when the current bushing (50) is completed to shape the final inner flanges, another bushing (501) is aligned with the bushing (50) with the desired number of final inner flanges. The extruding die (20) with the bushing (50) with the desired number of final inner flanges and the aligned next bushing (501) are positioned over the discharge hole (36) in the stepped base (30) with the bushing (50) with the final inner flanges being aligned with the discharge hole (36). The pressing block (70) presses the aligned next bushing (501) and extrudes the remainder of the bushing (50) with the desired number of final inner flanges until the completed bushing (50) is pressed out of the extruding die (20) and falls through the discharge hole (36).

The extruding die (20) with the bushing (501) is aligned with the uppermost flat surface (31) of the stepped base (30), and the process is repeated to form the final inner flanges in the bushing (51).

Figure 13:
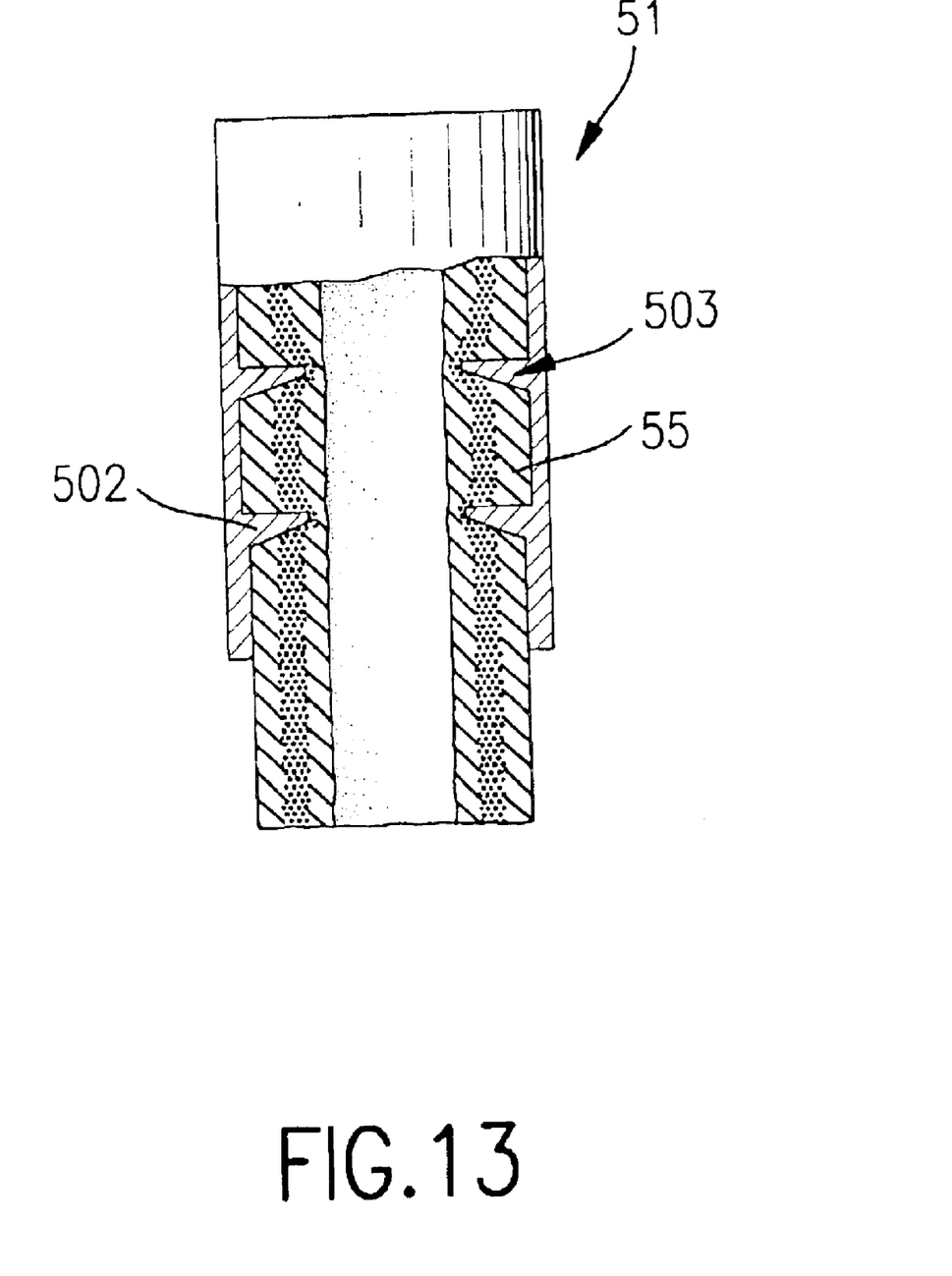
FIG. 13 is a side plan view in partial section of a hose mounted in a bushing formed by the method in FIG. 1.

With reference to FIG. 13, a bushing (51) with multiple final inner flanges (502, 503) in accordance with the present invention is used to connect a hose (55) that comprises a metallic layer (not numbered) and transmits hydraulic oil. The advantage of the method described is the creation of final inner flanges (502, 503) that have greater gripping capability because of the shape of the final inner flanges (502,503) increases structural strength of the final inner flanges (502, 503). The strengthened final inner flanges (502, 503) helps the final inner flanges (502,503) to dig into and penetrate slightly the hose (55) to deform the metallic layer in the hose (55), which permits the bushing (51) to only grip the hose (50). The distance between the adjacent final inner flanges (502, 503) provides more gripping area between the bushing (51) and the hose (55). The deformed metallic layer in the hose (55) provides much stronger bond between the final inner flanges (502,503) and the hose (55). Furthermore, the final inner flange (502, 503) has longer lifetime for not being damaged from the friction created by the friction between the bushing (51) and the hose (55).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method of forming inner flanges in a bushing comprising:
    (a) providing an extruding die having a first passage with a diameter, a taper passage coaxially aligned with the first passage and a second passage with a diameter, which is aligned with the first passage;
    (b) providing a stepped base mounted under the extruding die, and the stepped base having a first end, a second end, a discharge hole and multiple stepped flat surfaces arranged in a stepwise manner with an uppermost flat surface at the first end of the stepped base under the extruding die and a lowermost flat surface at the second end of the stepped base, wherein the discharge hole is defined in the lowermost flat surface;
    (c) extruding a bushing with a following end, a leading end and an inner periphery into the first passage, wherein the leading end is extruded into the first passage;
    (d) pressing the bushing until the leading end of the bushing abuts the uppermost flat surface with a pressing block;
    (e) cutting the inner periphery of the bushing to shape an initial upward flange in a position corresponding to the taper passage in the extruding die with a flange punch;
    (f) aligning the extruding die with a lower adjacent stepped flat surface of the stepped base;
    (g) flattening the initial upward flange to form a final inner flange with a flat-head punch wherein the flat-head punch presses the bushing with the leading end abutting the lower adjacent stepped flat surface;
    (h) repeating steps (e) to (g) until the extruding die with the bushing is aligned with the lowermost flat surface, thereby forming a plurality of final inner flanges; and
    (i) removing the bushing with the final inner flanges through the discharge hole.

2. The method of forming inner flanges in a bushing as claimed in claim 1, wherein the flange punch is a solid cylindrical rod with a cutting lip to cut the inner periphery of the bushing to shape the initial upward flange.

3. The method of forming inner flanges in a bushing as claimed in claim 1, wherein the flat-head punch has a flat end to flatten the initial upward flange to provide a flat top edge.

4. The method of forming inner flanges in a bushing as claimed in claim 1, wherein the first passage, the taper passage and the second passage communicate with each other, the taper passage is defined between the first and the second passages and the diameter of the second passage is smaller than the diameter of the passage.

* * * * *